United States Patent [19]

Scott

[11] Patent Number: 4,773,098
[45] Date of Patent: Sep. 20, 1988

[54] METHOD OF OPTICAL CHARACTER RECOGNITION

[75] Inventor: Warner C. Scott, Dallas, Tex.

[73] Assignee: Texas Instruments Incorporated, Dallas, Tex.

[21] Appl. No.: 501,037

[22] Filed: Aug. 1, 1983

Related U.S. Application Data

[62] Division of Ser. No. 153,392, May 27, 1980, abandoned.

[51] Int. Cl.$^4$ ............................................. G06K 9/48
[52] U.S. Cl. ......................................... 382/21; 382/22
[58] Field of Search .............................. 382/21, 22, 32

[56] References Cited

U.S. PATENT DOCUMENTS

| | | | |
|---|---|---|---|
| 3,609,685 | 9/1971 | Deutsch | 382/21 |
| 3,899,771 | 8/1975 | Saraga et al. | 382/21 |
| 4,093,941 | 6/1978 | Bryan | 382/21 |
| 4,097,847 | 6/1978 | Forsen et al. | 382/22 |
| 4,206,441 | 6/1980 | Kondo | 382/21 |
| 4,365,235 | 12/1982 | Greanias et al. | 382/13 |
| 4,415,880 | 11/1983 | Scott | 382/27 |
| 4,524,454 | 6/1985 | Ejiri | 382/21 |
| 4,542,526 | 9/1985 | Satoh et al. | 382/13 |
| 4,545,067 | 10/1985 | Juvin et al. | 382/21 |

OTHER PUBLICATIONS

Freeman, "On the Encoding of Arbitrary Geometric Configurations", *IRE Trans. on Electronic Computers*, Jun. 1961. pp. 260–268.

Saraga et al., "Optical Character Recognition", *Philips Technical Review*, vol. 28, No. 5/6/7, 1967, pp. 197–203.
Design of Logic for Recognition of Printed Characters by Simulation–E. C. Greanias, C. J. Hoppel, M. Kloomok, J. S. Osborne–IBM Jornal., 1/57, pp. 8–18.
The Recognition of Handwritten Numerals by Contour Analysis–E. C. Greanias, P. F. Meagher, R. J. Norman, P. Essinger–IBM Journal, 1/63, pp. 14–21.
Limited Vocabulary Script Reader, by E. T. Smithline–IBM Tech. Disclosure Bulletin, pp. 473–475, vol. 7, No. 6, 11/64.
K. Yoshida & H. Sakoe, "On–Line Handwritten Character Recognition for a Personal Computer System", IEEE Transactions on Consumer Electronics, vol. CE-28, No. 3, Aug. 1982.

*Primary Examiner*—Leo H. Boudreau
*Attorney, Agent, or Firm*—William E. Hiller; N. Rhys Merrett; Melvin Sharp

[57] ABSTRACT

A method for recognizing and providing an output corresponding to a character in which the character is received by an imager, digitized, and transmitted to a memory. Data in the memory is read in a sequence which circumnavigates the test character. Only data representative of the periphery of the character are read. During the circumnavigation, character parameters, such as height, width, perimeter, area and waveform are determined. The character parameters are compared with reference character parameters and the ASCII code for the reference character which matches the character is provided as an output.

4 Claims, 8 Drawing Sheets

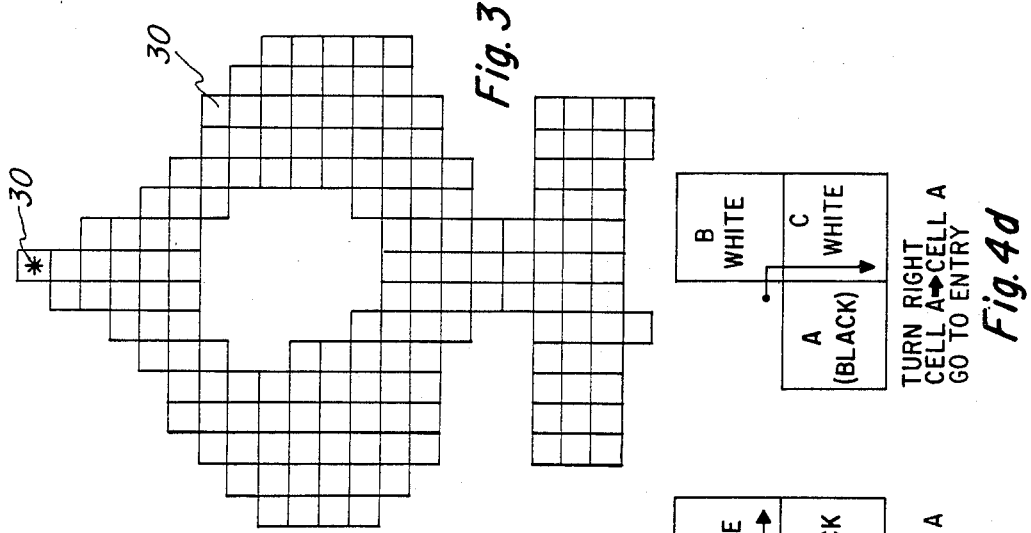
Fig. 3
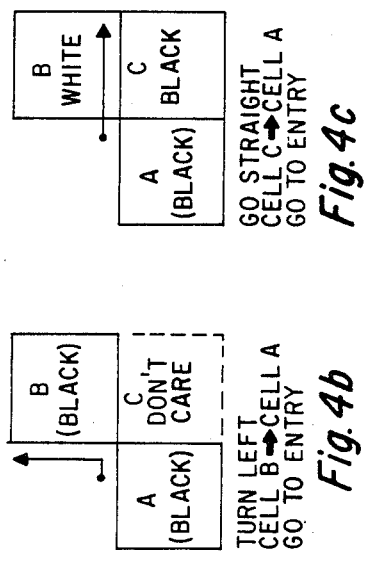
Fig. 1
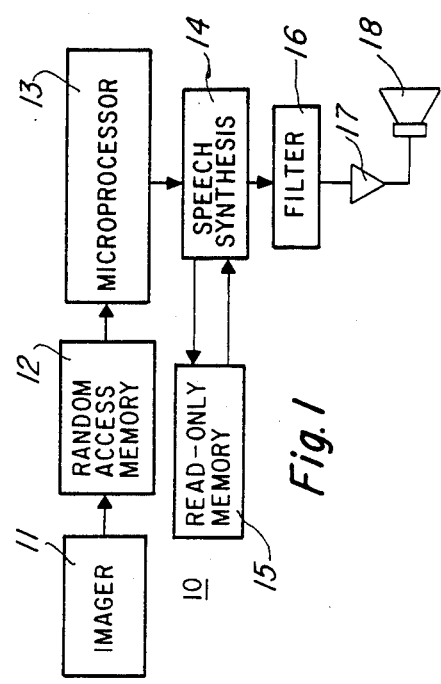
Fig. 4d
Fig. 4c
Fig. 4b
Fig. 4a

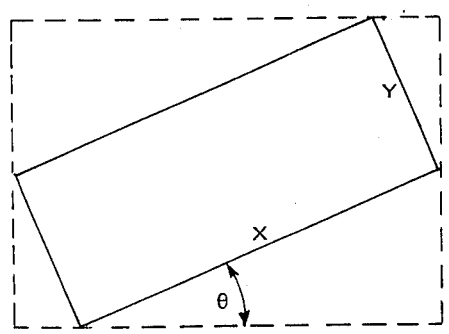
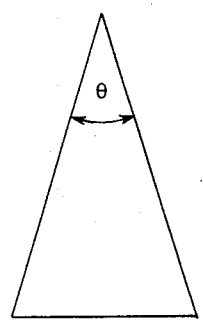
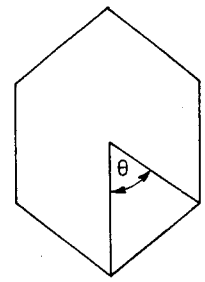
Fig. 12a      Fig. 12b      Fig. 12c
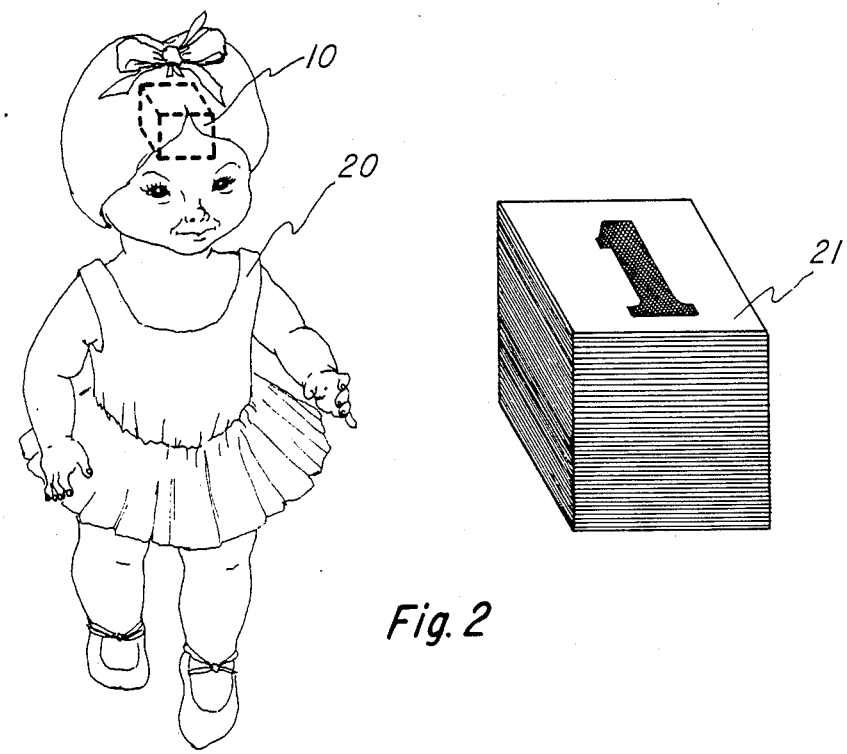
Fig. 2

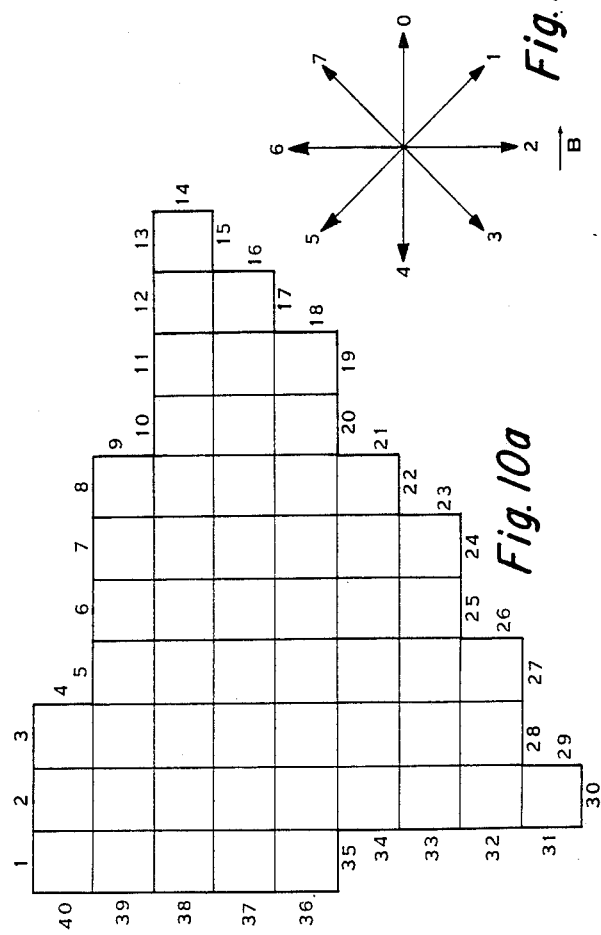
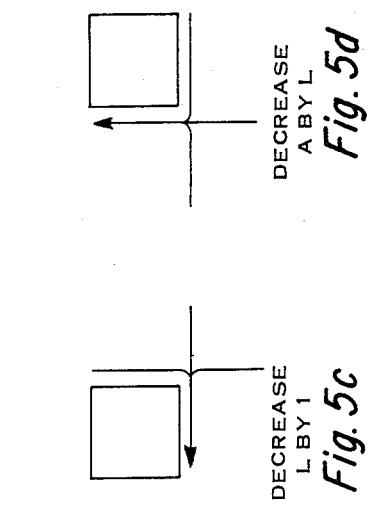

| STEP | A | L | STEP | A | L | STEP | A | L |
|---|---|---|---|---|---|---|---|---|
| 1 | 0 | 1 | 32 | 80 | 3 | 63 | 120 | -1 |
| 2 | 1 | 1 | 33 | 80 | 4 | 64 | 121 | -1 |
| 3 | 2 | 2 | 34 | 80 | 5 | 65 | 121 | -2 |
| 4 | 2 | 2 | 35 | 80 | 6 | 66 | 123 | -2 |
| 5 | 4 | 2 | 36 | 86 | 6 | 67 | 123 | -3 |
| 6 | 6 | 2 | 37 | 92 | 6 | 68 | 123 | -4 |
| 7 | 6 | 3 | 38 | 98 | 6 | 69 | 123 | -5 |
| 8 | 6 | 3 | 39 | 104 | 5 | 70 | 123 | -6 |
| 9 | 9 | 4 | 40 | 104 | 4 | 71 | 129 | -6 |
| 10 | 13 | 4 | 41 | 104 | 4 | 72 | 129 | -7 |
| 11 | 13 | 5 | 42 | 100 | 3 | 73 | 136 | -7 |
| 12 | 13 | 6 | 43 | 100 | 2 | 74 | 136 | -8 |
| 13 | 19 | 6 | 44 | 100 | 1 | 75 | 144 | -8 |
| 14 | 19 | 7 | 45 | 100 | 0 | 76 | 152 | -8 |
| 15 | 26 | 7 | 46 | 100 | -1 | 77 | 160 | -8 |
| 16 | 26 | 8 | 47 | 100 | -1 | 78 | 168 | -7 |
| 17 | 34 | 8 | 48 | 99 | -2 | 79 | 168 | -7 |
| 18 | 42 | 8 | 49 | 99 | -2 | 80 | 175 | -6 |
| 19 | 50 | 8 | 50 | 101 | -3 | 81 | 175 | -6 |
| 20 | 58 | 8 | 51 | 101 | -3 | 82 | 181 | -5 |
| 21 | 66 | 7 | 52 | 101 | -4 | 83 | 181 | -5 |
| 22 | 66 | 6 | 53 | 101 | -5 | 84 | 186 | -4 |
| 23 | 66 | 6 | 54 | 101 | -6 | 85 | 186 | -3 |
| 24 | 72 | 5 | 55 | 107 | -6 | 86 | 186 | -3 |
| 25 | 72 | 4 | 56 | 113 | -6 | 87 | 189 | -2 |
| 26 | 72 | 4 | 57 | 119 | -5 | 88 | 189 | -2 |
| 27 | 76 | 3 | 58 | 119 | -4 | 89 | 191 | -1 |
| 28 | 76 | 2 | 59 | 119 | -3 | 90 | 191 | -1 |
| 29 | 76 | 2 | 60 | 119 | -2 | 91 | 192 | -1 |
| 30 | 78 | 2 | 61 | 119 | -1 | 92 | 193 | -1 |
| 31 | 80 | 2 | 62 | 119 | -1 | 93 | 193 | 0 |

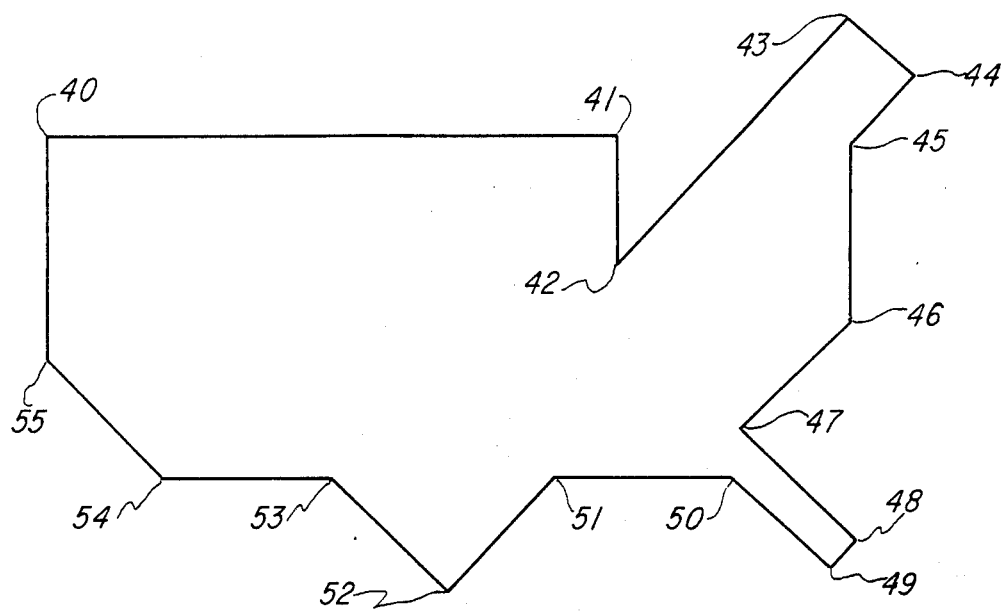
Fig. 8
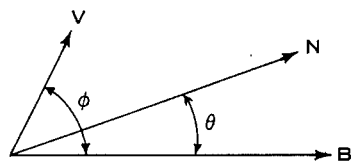
$|\phi| > |\theta|$
POSTPONE DECISION
Fig. 9a
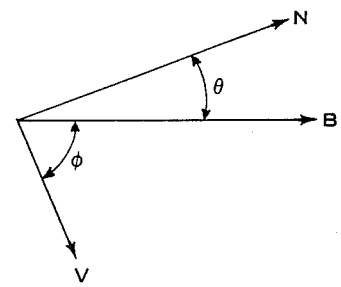
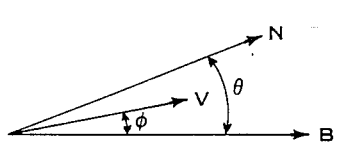
$|\phi| \leq |\theta|$
MAKE DECISION
Fig. 9b
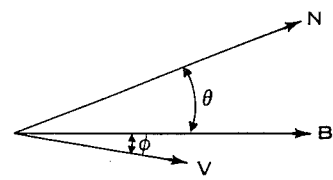
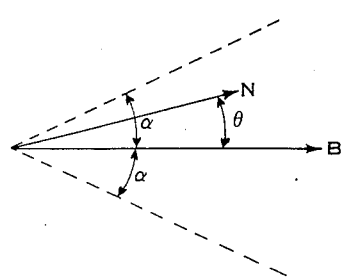
DECISION = NO
STILL ON SAME COURSE
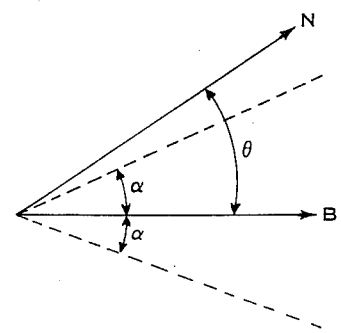
DECISION = YES
COURSE HAS CHANGED
Fig. 9c

| STEP | ↑B | N₁ | N₂ | N₃ | N₄ | ↑N | ↑V | ACTION |
|---|---|---|---|---|---|---|---|---|
| 1 | — | — | — | — | — | — | 0 | 1ST FIVE |
| 2 | — | — | — | — | 0 | — | 0 | AVG = 2/5 |
| 3 | — | — | — | 0 | 0 | — | 0 | ≈0 → |
| 4 | — | — | 0 | 0 | 0 | — | 2 | INITIAL ↑B = 0 |
| 5 | 0 | 0 | 0 | 0 | 2 | — | 0 | RESET |
| 6 | | 0 | 0 | 0 | 2 | 2/4 | 0 | NO CHANGE |
| 7 | | 0 | 0 | 2 | 0 | 2/4 | 0 | NO CHANGE |
| 8 | | 0 | 2 | 0 | 0 | 2/4 | 0 | NO CHANGE |
| 9 | | 2 | 0 | 0 | 0 | 0 | 2 | POSTPONE |
| 10 | | 0 | 0 | 0 | 2 | 2/4 | 0 | NO CHANGE |
| 11 | | 0 | 0 | 2 | 0 | 2/4 | 0 | NO CHANGE |
| 12 | | 0 | 2 | 0 | 0 | 2/4 | 0 | NO CHANGE |
| 13 | | 2 | 0 | 0 | 0 | 2/4 | 0 | NO CHANGE |
| 14 | | 0 | 0 | 0 | 2 | 0 | 2 | POSTPONE |
| 15 | | 0 | 0 | 2 | 4 | 2/4 | 4 | POSTPONE |
| 16 | | 0 | 2 | 4 | 2 | 6/4 | 2 | POSTPONE |
| 17 | | 0 | 4 | 2 | 4 | 8/4 | 4 | POSTPONE |
| 18 | 3 | 2 | 4 | 2 | 4 | 12/4 | 2 | ΔB = 3 |
| 19 | | -1 | -1 | -1 | -1 | — | -1 | RESET |
| 20 | | -1 | 1 | -1 | -1 | 0 | 1 | POSTPONE |
| 21 | 3 | -1 | -1 | -1 | -1 | 2/4 | -1 | POSTPONE |
| 22 | | -1 | 1 | -1 | -1 | 0 | 1 | POSTPONE |
| 23 | | -1 | -1 | -1 | -1 | 2/4 | -1 | POSTPONE |
| 24 | | -1 | 1 | -1 | -1 | 0 | 1 | POSTPONE |
| 25 | | -1 | -1 | -1 | -1 | 0 | -1 | POSTPONE |
| 26 | | -1 | -1 | -1 | -1 | 2/4 | 1 | POSTPONE |
| 27 | | -1 | 1 | -1 | -1 | 0 | 1 | POSTPONE |
| 28 | | -1 | -1 | -1 | -1 | 2/4 | -1 | POSTPONE |
| 29 | | -1 | 1 | -1 | -1 | 2/4 | 1 | POSTPONE |
| 30 | | -1 | -1 | -1 | -1 | 0 | 1 | POSTPONE |
| 31 | | -1 | -1 | -1 | -1 | 2/4 | 3 | POSTPONE |
| 32 | | 3 | 3 | 3 | 3 | 4/4 | 3 | POSTPONE |
| 33 | | 3 | 3 | 3 | 3 | 6/4 | 3 | POSTPONE |
| 34 | | 3 | 3 | 3 | 3 | 10/4 | 3 | POSTPONE |
| 35 | 6 | 3 | 3 | 3 | 3 | 12/4 | 1 | ΔB = 3 |
| 36 | | 0 | 0 | 0 | 0 | — | -2 | RESET |
| 37 | | 0 | 0 | 0 | -2 | -2/4 | 0 | NO CHANGE |
| 38 | | 0 | 0 | -2 | 0 | -2/4 | 0 | NO CHANGE |
| 39 | | 0 | -2 | 0 | 0 | -2/4 | 0 | NO CHANGE |
| 40 | | -2 | 0 | 0 | 0 | -2/4 | 0 | NO CHANGE |
| FINAL B = 6 | | | | | | FINAL Δ↑B = 2 | | |

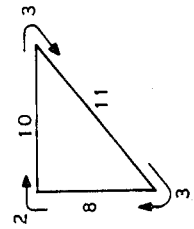

Fig. 11

METHOD OF OPTICAL CHARACTER RECOGNITION

This application is a division of U.S. patent application Ser. No. 153,342 filed May 27, 1980, abandoned in favor of continuation application Ser. No. 922,807 filed Oct. 27, 1986.

Disclosed is an apparatus and method for reading printed text using light sensitive scanners and inputting the scanned page into a memory. The memory is accessed by a microprocessor system which analyzes the stored data and outputs an ASCII code character for each letter, number or character on the page. Thus, a typed page can be input to a word processing or other computer storage systems without the need for manual typing.

This invention is particularly directed towards a method for generating data for optical character recognition (OCR). The character is received by an imager, digitized, and transmitted to a memory. Data in the memory is read in a sequence which circumnavigates the test character. Only data representative of the periphery of the character are read. During the circumnavigation, character parameters such as height, width, perimeter, area and waveform are determined. The character parameters are compared with reference character parameters and the ASCII code for the reference character which matches the character is provided as an output.

A character on a printed page is a two-dimensional character having height and width but no depth when viewed from above. The two dimensions vary in respect to each other so that the curves and shapes of each letter correspond to increasing or decreasing of one dimension while the other dimension remains the same, increases or decreases.

For example, the shape of the letter B being flat on one side and curved at other portions is determined by the width dimension being constant as the height varies along the flat side and the height and width varying with respect to each other at the curved locations. The two dimensions which represent the character are converted to a series of one-dimensional features which represent the character. The height is isolated as a single one-dimensional feature. The width is also isolated as a single one-dimensional feature. A series of contour numbers is determined which is a one-dimension array which represents the relationship between the two dimensions of the character as they vary on the character. In one embodiment of this invention, the two-dimensional features of the character are converted to corresponding one-dimensional features so that optical character recognition (OCR) can be performed. One embodiment of this invention for converting the two-dimensional features to a one-dimensional array is by circumnavigating the periphery of the character. The parameters determined from the circumnavigation can be arranged in one-dimensional arrays to provide a unique set of parameters for each reference character.

One particular method for generating data for OCR is done by looking only at the periphery of the character under examination. A novel method is provided whereby only that data which represents the periphery of the character is all that need be examined and tested to completely define all possible characters in all font types currently available in English. The data from the periphery of the character can be used in numerous ways to provide parameters about the character under examination. These parameters may be used as a teaching set to define reference characters for future use.

These parameters may also be used for a comparison with reference characters to identify the character under examination as part of the final step of OCR. A novel technique for testing only that data on the periphery of the test character is circumnavigation. The circumnavigation technique is an important time-saving and hardware-saving technique but is extremely powerful in extracting a large amount of data about the character which is circumnavigated.

Another novel feature provided by the method of this invention is the generation of contour numbers representing the shape of the contour of the character using the circumnavigation technique. This invention also provides that various parameters, such as height, width, perimeter and area within the periphery are determined using only data from the periphery of the character and are determined using data collected during the circumnavigation of the character.

It is to be understood that each of these sets of parameters could be used independent of each other or in combination with any of the other sets of parameters to perform complete character recognition. The combination of parameters which would be preferred, will depend on the character set being tested, the quality of the print being examined, the time allowed for character recognition, the number of characters in the set and many other variable features. It has been found that different combinations of parameters are more useful for different fonts in the English alphabet or in other languages.

Several steps form the method of this invention. Some of these steps may be used along or in various combinations with the other steps to produce data useful in OCR techniques. The data from circumnavigation of a character may be useful for many things, for example, as a teaching set, trial test set or as a new reference character data. In this mode, the data generated is not used to recognize a test character but is used for other purposes related to OCR. In a different mode, the data generated may be insufficient for complete recognition of a character, but still be very useful. For example, the steps may specify the height of a character and not be conclusive as to which character is being examined, but still vary useful data in many aspects, such as for elimating all capital letters or different fonts. Similarly, data from a single caliper test may not be conclusive as to which character is being examined but have utility in eliminating which character is not being examined.

BRIEF DESCRIPTION OF THE DRAWINGS

By way of example, and in order to describe various aspects of the invention in greater detail, together with the advantages thereof, reference is made to the drawings, wherein:

FIG. 1 is a block diagram of a didactic device as constructed in accordance with the present invention;

FIG. 2 is a diagrammatic view showing the didactic device of FIG. 1 as implemented in a doll having simulated sight and voice for viewing flash cards and audibly commenting on the respective objects depicted thereon in a comprehending manner in accordance with the present invention;

FIG. 3 is a diagram of an object to be viewed for character recognition;

FIGS. 4a-4d are diagrams illustrating a technique for characterizing individual objects in the field of view of the imager included in the didactic device of FIG. 1;

FIGS. 5a-5d are diagrams illustrating a technique employed for characterizing the number of individual cells or units within the boundary of the object in the field of view of the imager included in the didactic device of FIG. 1, as a generalized determination of the area of the object;

FIG. 8 is a diagram of a generalized contour or shape of an object to illustrate principles of the character recognition procedures employed by the didactic device of FIG. 1;

FIGS. 9a-9c are diagrams illustrating a technique for determining the contour or shape of an object in the field of view of the imager in the didactic device of FIG. 1;

FIG. 10a is a diagram of an object to be viewed for character recognition by the imager of the didactic device of FIG. 1;

FIG. 10b is a diagram of vector values to be assigned to respective current base course vectors as employed in the contour determination of the object shown in FIG. 10a;

FIG. 11 is a chart containing data relating to the contour determination of the object shown in FIG. 10a, and showing the final "contour signature" thereof;

FIGS. 12a-12c are diagrams illustrating particular geometrical shapes which may be recognized by the didactic device of FIG. 1.

DETAILED DESCRIPTION

Figure 6:
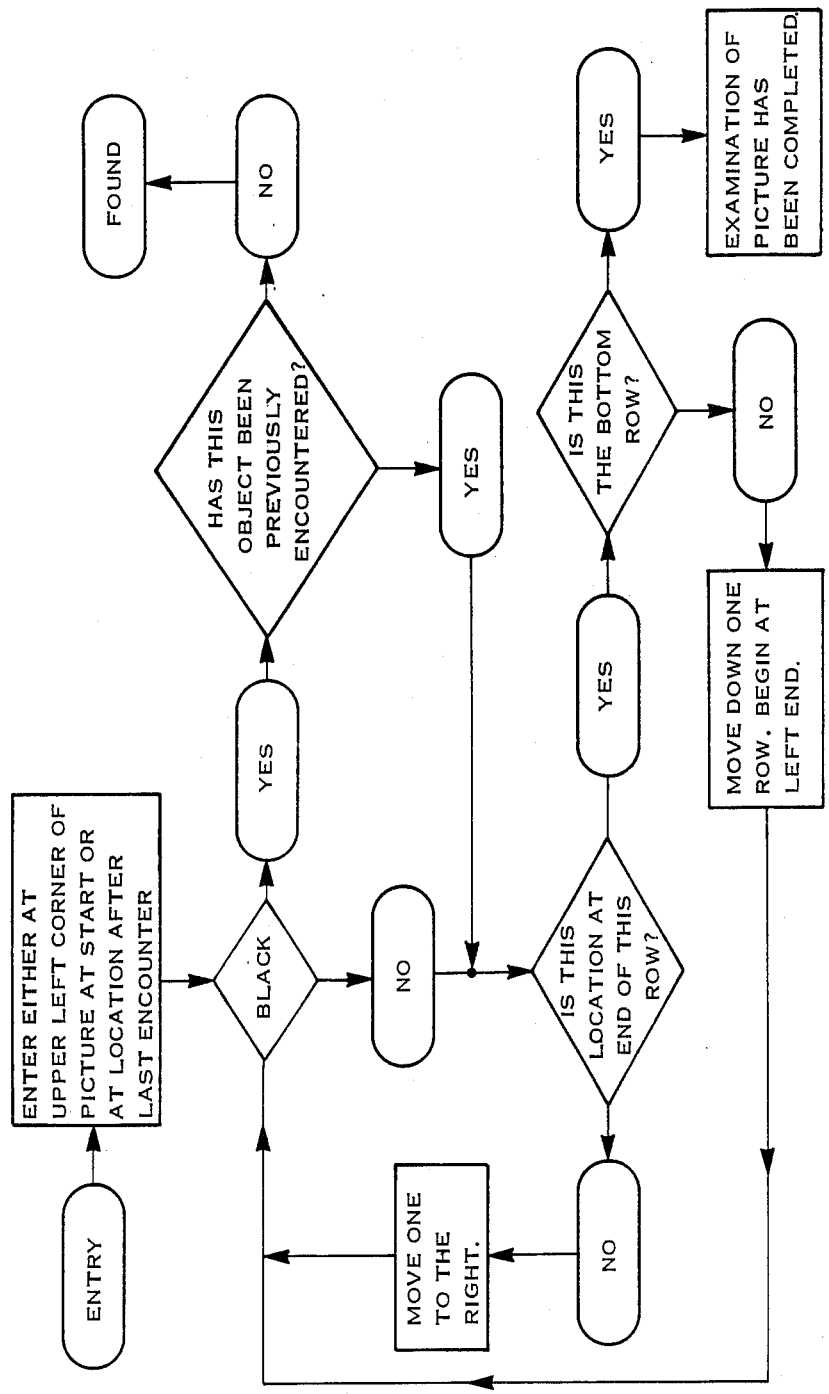
FIG. 6 is a flow chart illustrating a technique for finding an object in the field of view of the imager in the didactic device of FIG. 1 for character recognition thereof.

At the outset it will be understood that the didactic device offering optical character recognition accompanied by intelligent speech reflective of the content of what is seen will be susceptible of numerous physical embodiments depending upon how the didactic device is intended to be used and its environment of use.

Referring more particularly to the drawings, FIG. 1 illustrates a block diagram of a didactic device or educational teaching aid 10 as constructed in accordance with the present invention for providing a learning experience and/or entertainment. The didactic device 10 of FIG. 1 comprises a composite system, wherein an optical character recognition processing sub-system is combined with a speech synthesis sub-system such that the didactic device is enabled to simulate sight and speech for identifying objects and vocalizing such object identification in an appropriate manner. To this end, the optical character recognition sub-system includes a visual detector means in the form of an optical imager 11 for viewing an object and providing a signal data output indicative of the appearance of the object. The imager 11 may be in any one of several suitable forms, such as an electronically scanned photosensor, i.e. a television camera vidicon; a mechanically scanned photosensor, wherein movement of a sensor or mirror across a field of view is accomplished by mechanical means; photographic film; or a "staring" multiple element array, such as an array of charge coupled devices or any matrix array having a plurality of discrete points. In a preferred form, the imager 11 may be a charge coupled device imager array on a single imager chip containing 32×32 array elements in the matrix. The image processing sub-system further includes a memory 12, and a data processor in the form of a microprocessor 13 having a character recognition comparator incorporated therein. The memory 12 is preferably of the random access type having a storage capacity capable of accepting the signal data output from the imager 11. Thus, the random access memory 12 may have a small storage capacity, e.g. of 32×32 bits corresponding to the array of imager cells. The random access memory or RAM 12 is connected to the output of the imager 11 and is arranged in columns and rows of bits which may be designated as pixels with white pixels being of a "0" binary value and black pixels being of a "1" binary value. Thus, the contents of the RAM 12 constitute a digital image of the image received on the viewing face of the imager 11 corresponding to an object disposed in the field of view. The microprocessor 13 acts as a central processor unit and includes a microcontroller for examining the contents of the RAM 12. The microprocessor 13 further includes a read-only-memory (ROM) which contains a program with instructions for controlling the microprocessor. The ROM may provide for analog-to-digital conversion of the image signal data, followed by the location and discretizing of the image, i.e. the location of discrete objects in the field of view of the imager 11, where any such object is, and how tall the object is. The microprocessor 13 further includes a random access memory RAM for data storage during its computing operations, wherein data signatures of a multiple number of object configurations are stored in the form of firmware for comparison with the digital data comprising the image as stored in the RAM 12. To this end, the microprocessor 13 includes analyzer means in the form of a character recognition comparator as part of the data processing capability thereof the character recognition comparator producing an analytical signal output determinative of the comparative analysis between the digital image data from the RAM 12 and the firmware stored within the RA of the microprocessor 13. The microprocessor 13 may be a TMS 8080 microprocessor or a TMS 9980 microprocessor as manufactured by Texas Instruments Incorporated of Dallas, Tex., or any suitable microprocessor depending upon the degree of complexity of the application desired for the didactic device 10. In this sense, it will be understood that any suitable optical character recognition apparatus could be employed as the image processing sub-system of the didactic device 10 as constructed in accordance with the present invention. In this respect, although a relatively unsophisticated optical character recognition subsystem may be satisfactory for use in the present didactic device, it will be understood that a more sophisticated optical character recognition apparatus such as that disclosed and claimed in pending U.S. patent application, Ser. No. 115,986, filed Jan. 28, 1980 (Case No. TI-7543) may be employed.

The optical character recognition processing sub-system is combined with a speech synthesis sub-system which includes speech synthesis electronics 14, a vocabulary memory 15 and sound conversion circuitry connected to the output of the speech synthesis electronics 14, wherein the sound conversion circuitry may include an appropriate low pass filter 16, an audio amplifier 17 and a speaker circuit 18 of a suitable type for converting the audio output from the speech synthesis electronics 14 to sound energy. By way of example, the speech synthesis electronics 14 may employ a linear predictive coding technique preferably including a speech synthesis semiconductor chip, such as the TMC 0280 speech synthesis chip manufactured by Texas Instruments Incorporated, Dallas, Tex. This chip operates from sequentially called single frames of digitally stored speech intelligence and is of a type disclosed in the aforesaid pending U.S. patent application Ser. No. 901,393, filed Apr. 28, 1978. This particular speech synthesis technique utilizes an electronically alterable model of the human vocal track which is configured by digital input. Along with the digital configuration input, pitch and other excitation digital control signals are applied to generate an analog signal representing the audio sound requested and identified by the digital information input to the speech synthesis chip 14 via the vocabulary memory 15 which preferably is of a read-only type. Previously digitally coded speech (which may be words, phrases, and sentences, for example) is stored in the vocabulary memory 15 and applied to the speech synthesis chip 14 as required in response to the accessing thereof via the speech synthesis chip 14 as determined by the analytical output signal from the character recognition comparator of the microprocessor 13. It will be understood that other suitable forms of speech synthesis systems may be employed in the didactic device 10 in accordance with this invention. Thus, a didactic device or educational learning aid 10 has been provided combining optical character recognition with speech so as to offer a significant number of applications as learning aids as well as providing entertainment and amusement. In a particular aspect, the didactic device 10 is incorporated into a doll so as to combine the human functions of apparent sight and speech, wherein the speech is reflective of what has been "seen" in providing vocal comments of a comprehending nature. As illustrated in FIG. 2, a doll 20 equipped with a didactic device 10 in accordance with the present invention as shown in FIG. 1 may be called upon to "identify" the object, legend and/or symbol depicted on a flash card as included in a stack of such flash cards 21, wherein different indicia are provided on the respective flash cards. By virtue of the simulated sight provided by the image sub-system and the simulated speech provided by the speech synthesis sub-system of the didactic device 10, the doll 20 is able to detect and recognize "playing cards", for example, and to name the "suit" and "rank" of same. The doll may also identify and vocally describe various geometric shapes. The degree to which the doll may be able to "identify" and vocally "name" various objects is limited only by the storage capacity of the RAM included in the microprocessor 13 of the didactic device 10. The doll 20 may be in human form, or may simulate the appearance of other living creatures, such as animals or birds. Variations of the didactic device as contemplated within the spirit of this invention could include the inclusion of a random number generator incorporated with the optical character recognition comparator of the microprocessor 13 that arbitrarily causes a "mistake" in identity to occur at infrequent instances, such that the doll 20 could be punished for misnaming the object on the flash card exposed to the imager 11 such as by "spanking" on the rear area to actuate a concealed microswitch, whereupon the doll is programmed to try again in identifying the object on the flash card. Thus, the doll 20 has the simulated capability of "sight", can vocally comment on what it has "seen", and is capable of interaction with the child whenever a randomly prearranged "mistake" is made by the doll 20 in identifying the object on the flash card. Since the flash cards may depict recognizable objects such as the alphabet and arabic numerals, the doll 20 can serve as an educational teaching aid to a child in the proper identification of such symbols.

In order to implement the "object identification" accomplished by the imager processing sub-system, a number of computational techniques may be interchangeably adopted for use by the microprocessor 13 in evaluating the digital image data stored in the RAM 12 for comparison with the multiple number of data signatures of object configurations incorporated as firmware in the RAM memory storage of the microprocessor 13. To this end, an arbitrary object configuration providing a binary (black/white) image will be considered, such as the object illustrated in FIG. 3. In this connection, it will be understood that each of the individual square "units" or "cells" 30 of the object are "black" or a binary "1", while undesignated blank areas (of the same size units) associated with the object are "white" or a binary "0". The object of FIG. 3 would then exist as a series of "1's" and "0's" in the matrix of the RAM 12 representing the digital image data of the object as viewed by the imager 11. Optical character recognition attempts to extract as much information as possible from such image signal data as efficiently as possible. Typical of problems to be solved are: How many different objects are there in the picture? Where is each object located? How large is each object? What shape is each object? Are any of the objects not simply connected solids (i.e., contain holes)? Finally, is there anything in the digital image data being processed for object identification that matches an image that the microprocessor 13 has been programmed to recognize?.

In solving such problems, a number of computational techniques may be employed in various combinations. In discussing these computational techniques, it will be understood that the roles of black vs. white, left vs. right, x vs. y, etc. are interchangeable. Further, for purposes of this discussion, the convention shall be adopted of objects being "black" against a "white" background.

FINDING OBJECTS

Beginning at a starting position in the upper left-hand corner of the picture as represented by the signal data output contained by the RAM 12, each pixel or "cell" or "unit" is examined by the microprocessor 13 under the control of its ROM in a raster scanning mode until a "black" pixel is encountered (assuming that there is anything to see at all). If this "black" pixel is not "labeled" as belonging to a previously encountered object (to be discussed hereinafter), a new object has been found. FIG. 6 illustrates a flow chart of this procedure.

COUNTING OBJECTS

Beginning with a count of 0, the count is incremented each time a new object is encountered if this is all the information that is desired. However, this counting procedure can be more detailed, such as by counting individually the number of round objects, objects smaller than a certain size, objects whose perimeter-squared to area ratio falls in a certain range, etc.—as dependent upon the desired application. This procedure could have an end result of a zero count for all objects to trigger a system response to acquire another image using a shorter integration time (as the image may have been saturated) or, if other data prove this not to be the case, a suitable vocal output to the user via the speech synthesis sub-system, e.g., "I don't see anything at all."

OBJECT CHARACTERIZATION BY CIRCUMNAVIGATION

Characterizing individual objects in the field of view of the imager 11 encompasses a determination by the microprocessor 13 of the topology of the object, namely—its size, shape, connectivity, aspect ratio, boundary properties, etc.—as a necessary precursor to enable the didactic device 10 to recognize the object for the purpose of generating appropriate vocal responses via the speech synthesis electronics 14 to the user. To this end, an object characterization technique which may be termed a "circumnavigation" procedure enables the extraction of a large amount of information about the configuration of the object. Referring to the object illustrated in FIG. 3, assume that the "find" procedure in accordance with the flow chart illustrated in FIG. 6 is being executed by the ROM of the microprocessor 13 and that the black pixel or cell 30 having the asterisk and located at the top of the object has been encountered. As a first procedure in characterizing this object, the "circumnavigation" technique envisions "walking around the periphery" of the object, while simultaneously monitoring certain parameters and taking certain actions in the course of the circumnavigation procedure which enables a significant amount of information about the topology of the object to be extracted.

In the object characterization by "circumnavigation", certain procedure "rules" are followed, as depicted in FIGS. 4a–4d. The "rules" of the circumnavigation procedure may be summarized, as follows:

(1) The "always turn left" (or right) rule is followed, this being a basic technique employed to teach a computer to find its way out of a maze. Referring to FIG. 4a, assume that the point position is as shown adjacent to the cell A which has been identified as a "black" cell designating a binary "1". FIGS. 4b–4d indicate the three possible conditions confronting the point location, and the direction of movement which the point must take in order to trace out point movement around the periphery of an object, such as the object shown in FIG. 3. Thus, if movement of the point encounters a black pixel or cell 30 at cell position B, movement of the point is turned in a leftward direction, with cell B now becoming cell A for further determination of the point movement. On the other hand, if cell position B is a "white" pixel designating a "0" binary state, movement of the point proceeds in the manner indicated by either FIGS. 4c or 4d, depending upon whether cell position C is a "black" or "white" pixel respectively designating a "1" binary state or a "0" binary state. Thus, if cell position C is a "black" pixel, the point movement proceeds straight ahead along the boundary of the "black" pixel at cell position C which now becomes cell position A for subsequent point movement. On the other hand, if cell position C is a "white" pixel as depicted in FIG. 4d, the movement of the point is turned right and the point proceeds downwardly along the perimeter of the "black" pixel at cell position A which remains as cell position A for subsequent movement of the point. This procedure is followed in a continuing cycle, until the point has been moved entirely around the perimeter of the object and has returned to the starting cell 30 as designated by the asterisk in FIG. 3.

(2) While movement of the point is taking place in the manner indicated, accumulative totals are maintained in the RAM of the microprocessor 13 of the respective numbers of "go straight", "turn left", and "turn right" movement transitions which have been made. This information may then be used at a later time to calculate the approximate perimeter of the object.

(3) As the point movement proceeds, the extreme X and Y coordinate positions assumed by the point during its movement, i.e., the furthest north, east, south, and west in the field of view attained by the point while circumnavigating the object, are "flagged" for data retention.

(4) As point movement proceeds, if it is determined that the point is located on either the west or east edge of the object (in the context of the "find" procedure), that particular cell 30 is appropriately labeled by "tagging", so that subsequently the "find" procedure can discriminate against previously encountered objects.

(5) As movement of the point occurs, certain computations which have the effect of digitally reproducing the action of a mechanical planimeter may be made so that a measure of the area of the object being circumnavigated may be extracted.

(6) Finally, as the movement of the point proceeds, information as to the "instantaneous heading" of the point is continuously made available to an appropriately coded "contour extraction" algorithm having the purpose of deducing the general "shape" of the object.

PERIMETETR CALCULATION

By denoting the number of "go straight" transitions, i.e. FIG. 4c, made by the point during its circumnavigation of the object by the symbol N1 and the number of "turn left" (FIG. 4b) and "turn right" (FIG. 4d) transitions by the point by the symbol N2, the perimeter of the object may be essentially approximated by:

$$P = N1 + N2/\sqrt{2}. \tag{1}$$

AREA CALCULATION

In approximating the area of the object, the operation of a mechanical planimeter may be digitally simulated by first initializing the parameters A and L to 0 and 1, respectively. Thereafter, as the circumnavigation procedure carried out by the moving point is being practiced, the rules illustrated in FIGS. 5a–5d are followed at each transition, such that when the point has been returned to the starting cell 30 as identified by the asterisk in FIG. 3, the parameter A will be equal to the number of cells 30 contained within the boundary of the object. Thus, if the transition is in a right-hand direction, the parameter L is increased by 1, as illustrated in FIG. 5a. If the transition of the moving point is in a downward direction, the parameter A is increased by the count for the parameter L, as indicated in FIG. 5b. Transition movement of the point in a left-hand direction calls for the parameter L to be decreased by 1, as in FIG. 5c, while transition movement of the point in an upward direction as shown in FIG. 5d calls for the parameter A to be decreased by the count for the parameter L.

Figures 7A, 7B:
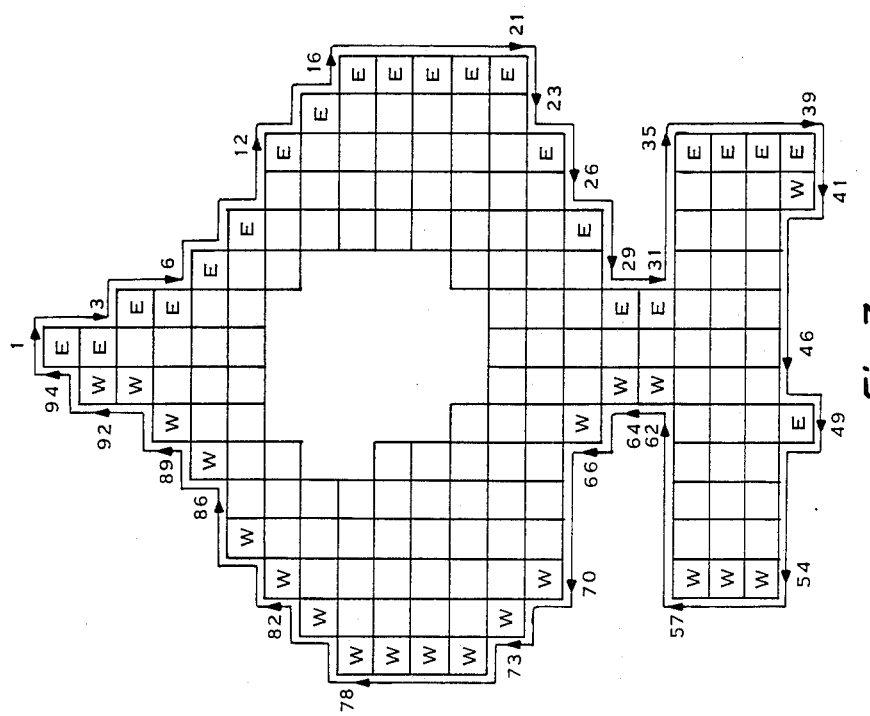
FIG. 7a is a diagram of an object for character recognition, similar to FIG. 3, but showing boundary labeling of individual cells or units of the object.
FIG. 7b is a chart containing data relating to the boundary labeling procedure of FIG. 7a and the technique for generalizing the area determination of the object of FIGS. 5a-5d.

Referring to FIGS. 7a and 7b, the effect of this procedure digitally simulating the operation of a mechanical planimeter as employed on the object shown in FIG. 3 is indicated. In this respect, FIG. 7a illustrates the object of FIG. 3 as circumnavigated by a moving point in accordance with the technique illustrated in FIGS. 4a-4d identifying the direction of movement of the point and certain transition step numbers as the point moves about the perimeter of the object. As previously described, individual cells 30 found to be on either the "west" or "east" edge of the object as determined by the "find" procedure of FIG. 6 are appropriately labeled in the memory storage of the microprocessor 13. The table shown in FIG. 7b contains data obtained from following the rules illustrated in FIGS. 5a-5d for area calculation. Thus, step #1 begins with the initialized values A=0 and L=1. Step #2 is a downward transition movement for the point, as depicted in FIG. 5b, wherein A is increased by the count for L. Thus, the table shown in FIG. 7b at step #2 gives the values: A=1 and L=1. Step #3 continues with a downward transition movement, whereby the parameter A is increased by the count of the parameter L, such that A now equals 2, while L equals 1. The values of A and L continue to be affected by the rules as illustrated in FIGS. 5a-5d, being tabulated in the table of FIG. 7b. At the conclusion of the circumnavigation procedure, or step 94, the parameter A equals 193, while the "go straight" transitions N1 equal 39 and the "turn left" or "turn right" transitions N2 equals 55, such that the perimeter of the object approximates 77 by applying the values for N1 and N2 to the equation (I).

FILLING FACTOR

Upon completion of the circumnavigation procedure wherein the moving point is caused to travel about the entire perimeter of the object, extremal X and Y coordinates encountered by the point during its circumnavigation movement will have been "tagged" and stored within the RAM contained in the microprocessor 13. Having the data information provided by these extremal X and Y coordinates, it is then possible to calculate the area of the smallest Cartesian-oriented box which totally contains the object, via the following equation:

$$B = (Xman - Xmin) * (Ymax - Ymin), \quad (II)$$

where B is the area of the smallest Cartesian-oriented box totally containing the object. In certain circumstances, the ratio of the actual area A of the object to the area B may be of use in determining further information about the object.

BOUNDARY LABELING

In addition to discriminating against previously encountered objects as an aid in the "find" procedure diagrammed by the flow chart of FIG. 6, boundary labeling as illustrated by those cells 30 marked "W" for "west" or "E" for "east" in FIG. 7a is useful in another respect. If a determination is to be made as to whether the object is a simple solid object or if it contains one or more "holes" therein, a new "find" procedure based upon the flow chart sequence of FIG. 6 may be instituted which is not allowed to begin until the raster scan is determined to be between a "W" cell 30 and an "E" cell 30 of a previously encountered object. Then, by reversing the finding of "black" and "white" cells, all of the previously-described procedures including the "find", "count", and "circumnavigate" procedures may be iterated to investigate the nature of the hole(s) within the object. This technique is practiced by using the same ROM code within the microprocessor 13 and can be nested indefinitely.

CONTOUR EXTRACTION

Another technique which may be implemented in the use of the didactic device 10 in accordance with the present invention may be termed a "contour extraction" procedure, wherein a detailed description of the "shape" or configuration of an object may be obtained. In the previously described circumnavigation procedure, the outline of an object is meticulously traced by a pixel-by-pixel or cell-by-cell approach. The "contour extraction" procedure to be hereinafter described has as its purpose the provision of a capsule description of the shape of an object and may be accomplished by imposing the following criteria on the transition movements of a point in traveling about the boundary of the object whose shape is to be determined.

(1) The description of "current heading" is confined to one of the following eight bearings: north, northeast, east, southeast, south, southwest, west, and northwest. Therefore, changes in course are reported in increments of 45° and identified as being either to starboard or to port.

(2) No determination as to a course change is made until the most recent headings have exceeded 45° offset from the old course for a predetermined distance of some length. If deviations from the old course heading are of relatively short length and the old course heading is then resumed, this rule provides that such minor course deviations are to be ignored.

(3) If a definite change in course is detected, the determination of the new course or "current heading" is not made until the new course heading has been pursued for a predetermined length.

(4) The distances traveled on each leg or "current heading" of the object perimeter journey are simply described as short, medium, long, and very long.

Using these criteria, assume that the imager 11 of the didactic device 10 has a field of view in which a map of the United States appears. Using the "contour extraction" procedure which is stored in the ROM portion of the microprocessor 13, and based on the foregoing criteria, the signal data as obtained from the imager 11 and stored in the RAM 12 would be converted in the RAM central processing unit of the microprocessor 13 so as to provide an object with a shape such as is illustrated in FIG. 8 for subsequent comparison and analysis by the character recognition comparator with data signatures of various object configurations as stored in the RAM portion of the microprocessor 13.

Referring to FIG. 8, and paraphrasing the description of the object illustrated therein as being derived from a map of the United States, a descriptive report might read something like the following—From the starting position 40 (Seattle), the point moved due east for a very long distance to position 41. Then, the point turned 90° to the right (Lake Huron) and proceeded a short distance to position 42. At position 42, the point turned 135° to the left (Detroit) and proceeded on this new course for a long distance to position 43. Then, there followed a 90° turn to the right, a short leg to position 44, and another 90° turn to the right (Maine). The next leg to position 45 is short, but resulted from a number of radical course deviations which were ignored under rule (2) of the criteria for the "contour extraction" procedure. Then, a 45° turn to the left (New York city) occurred, and after a medium leg on this course to position 46, a 45° turn to the right (Cape Hatteras) occurred and continued for a medium distance to position 47. Then, a turn to the left of 90° was followed by a journey of medium length to position 48, after which two 90° turns to the right occurred with a short leg 49 in between (southern tip of Florida). A medium distance was traveled on the last course, to position 50 (vicinity of Tallahassee, Florida), followed by a 45° turn to the left. After a medium distance to position 51, (Beaumont, Tex.) another 45° turn to the left occurred, followed by a medium distance to position 52 (Brownsville, Tex.), and then a 90° course change to the right. After a medium stretch on this leg to position 53, (El Paso, Tex.), a 45° turn to the left was followed by a medium leg to position 54 (San Diego, Calif.), and then a 45° turn to the right. Thereafter, another medium leg occurred to position 55, (San Francisco, Calif.), then a 45° turn to the right, and a final long distance back to the starting location 40 (Seattle, Wash.). Assuming that the language of the microprocessor code assigns the values 1, 2, 3 and 4 for the respective lengths (short, medium, long and very long) of the course distances, that course changes of 45N degrees are reported as N where +N means a turn to the right and −N means a turn to the left, and that each leg of the outline is reported in the format (l, c) where l=the length of each leg and c=the course change at the end of that leg, a contour data signature of the object shown in FIG. 8 would read:

| (4,2) | (1,−3) | (3,2) | (1,2) | (1,−1) | (2,1) | (2,−2) |
|---|---|---|---|---|---|---|
| (2,2) | (1,2) | (2,−1) | (2,−1) | (2,2) | (2,−1) | (2,1) |
| (2,1) | (3,2). | | | | | |

Although the shape of the object shown in FIG. 8 is considerably distorted, it is nevertheless readily recognizable as a general outline of the United States. Even with the most primitive character recognition code, data corresponding to this generalized outline of the United States is sufficiently specific to avoid recognition errors for the generalized outline of other countries of the world, such as Brazil, India, England, France, Germany, Spain, etc.

The implementation of the contour extraction technique requires adherence to the previously mentioned criteria which are generally illustrated in FIGS. 9a-9c. The contour extraction procedure is combined with the circumnavigation procedure such that at the start of the circumnavigation procedure, a determination is made as to the vector sum of the first individual steps to obtain an original base course B. After each transition movement, the following procedures as diagrammed in FIGS. 9a-9c are adopted in practicing the contour extraction procedure.

(1) Assuming that the base course B is known, the last several N individual transition vectors are accumulated in the memory storage of the microprocessor 13 and their vector sum N is formed.

(2) Next, the absolute value of the angle $\phi$ between the base course vector B and the most recent transition vector V is compared against the absolute value of the angle $\phi$ between the base course vector B and the vector sum N. If the angle $\phi$ is greater than the angle $\theta$, it is assumed that the change in angles has not "settled down" to a definite value, although a macroscopic course change may be detectable. Accordingly, a decision as to the subsequent course direction is postponed for at least one more transition movement. This is the condition illustrated in FIG. 9a. If, however, the angle $\phi$ is less than or equal to the angle $\theta$, this condition enables a determination as to whether or not a course change has taken place. This is the condition illustrated in FIG. 9b. If the $\theta$ is less than some predetermined constant angle $\alpha$, any deviation from the base course B is sufficiently small so that it may be ignored as though no course change has been detected. If, however, the angle $\theta$ is greater than the angle $\alpha$, a change in course has indeed occurred. At this point, the base course B is terminated, and its length is calculated via the formula:

$$L = \sqrt{(X - X_0)^2 + (Y - Y_0)^2} \quad \text{(III)}$$

where (X,Y) are the coordinates of the present location, and $(X_0,Y_0)$ are the coordinates of the location of the last course change.

(3) Next, a new base course B' is computed, using the old base course B together with the angle $\theta$ as a guide, the coordinates $(X_0,Y_0)$ are replaced with the new present coordinates (X,Y), and other computations which may have relevance to a particular application are made.

(4) Finally, the most recent transition vector V is entered into the retained arra of the N previous individual transition vectors in the "most recent" position, with the other transition vectors moved backwardly in the storage array such that the "least recent" transition vector is discarded from memory.

Referring now to FIGS. 10a and 10b, a configuration or shape of an object for character recognition by the imager 11 of the didactic device 10 of FIG. 1 is illustrated by way of example in FIG. 10a to further explain how the contour extraction technique may be implemented. FIG. 10b diagrammatically identifies the values assigned to the current "base course" vector represented by the symbol $\overline{B}$. For example, a "due east" course for the current "base course" vector $\overline{B}$ has a value of "0", while a "due west" course would have a value of "4". In traveling about the perimeter of the object shown in FIG. 10a whose shape or configuration is to be characterized, the symbols $N_1-N_4$ as adopted in the table illustrated in FIG. 11 represent the last four individual transition vectors, N is the average value of these four individual transition vectors $N_1-N_4$, and V is the most recently encountered transition vector. The table of FIG. 11 contains data based upon the value diagram of FIG. 10b and obtained in following a moving point about the perimeter of the object shown in FIG. 10a. It will be understood that the rules described in conjunction with FIGS. 9a-9c are applied as the moving point travels about the perimeter of the object shown in FIG. 10a. In this respect, it will be observed that each time $|\vec{V}|$ is greater than $|\vec{N}|$, the action taken is to postpone a decision in accordance with the rule illustrated in FIG. 9a. The individual steps or "legs" about the perimeter of the object shown in FIG. 10a are numbered consecutively. At the end of each step, $\vec{V}$ is entered in the $N_4$ column of the table shown in FIG. 11, all values $N_4$–$N_2$ are shifted back one position, and the value $N_1$ is discarded as the "least recent" transition vector in the series.

Upon the detection of a non-zero course change (identified as $\Delta B$ in steps 18 and 35 of the table shown in FIG. 11), $\vec{B}$ is reset, along with the resetting of the value $\vec{V}$ and the N's to values relative to the new value $\vec{B}$, as opposed to the old $\vec{B}$. This is accomplished by subtracting $\Delta B$ from the previous values of $\vec{V}$ and the N's.

Although the outer contour of the object shown in FIG. 10a has been described as being determined in terms of vectors quantized to 45° increments, it will be understood that the quantizing increments may be other than 45°, such as 30°, 22.5°, etc. depending upon the application desired. Similarly, while the example provided in FIGS. 10a–10b and the data contained in the table of FIG. 11 provides for the saving of the four most recent transition vectors, $N_1$–$N_4$, this choice is arbitrary and the number of such transition vectors may be increased or decreased, depending upon the degree of sophistication desired in determining a contour signature for an object as detected by the imager 11 of the didactic device 10 of FIG. 1.

Thus, the "data signature" or configuration of an object is determined by the contour extraction technique in terms of a series of "course changes" required to circumnavigate the object. The basic topological features of an object are extracted by this technique which may be performed by the RAM included in the microprocessor 13 of the didactic device 10 shown in FIG. 1. The final contour "data signature" for the object illustrated in FIG. 10a based upon the contour extraction procedure as described is (10, 3) (11, 3) (8, 2), and the object may be identified by the central processing unit of the microprocessor 13 as generally conforming to a right-angle scalene triangle.

In enabling various geometrical shapes to be recognized and described from data acquired from the imager 11 of the didactic device 10 shown in FIG. 1, if it be assumed that the contour extraction technique indicates the outline of the object to be basically four vectors each oriented at successive 90° turns to the right with respect to the previous one, the object is identified as essentially a rectangle, as illustrated in FIG. 12a. The calculation of the length-to-width ratio x/y and the angle of orientation 8 can be accomplished via a straightforward trigonometric derivation, using the equations:

$$\frac{x}{y} = \frac{z + \sqrt{z^2 - 4}}{2}, \text{ where } z = \frac{S^2}{A} - 2 \quad \text{(IV)}$$

and $$\theta = \tfrac{1}{2} \sin^{-1}\left[\frac{2(B - A)}{S^2 - 2A}\right] \quad \text{(V)}$$

In the foregoing equations (IV) and (V),
S = the semi-perimeter (one-half of the perimeter);
A = the area of the rectangle; and
B = the area of the dotted outline,
all of which may be directly measured by the circumnavigation procedure.

As to the isosceles triangle shown in FIG. 12b, the angle $\theta$ may be determined by the following equation:

$$\frac{S^2}{A} = \frac{2\left(1 + \sin\left(\frac{\theta}{2}\right)\right)^2}{\sin \theta} \quad \text{(VI)}$$

A determination of whether the triangle is acute or obtuse may be made by comparing whether the medium length of the three sides is closer to the length of the longest or the length of the shortest side.

Referring to the N-sided regular polygon shown in FIG. 12c, the contour extraction technique will have provided N vectors which are generally equal in length and successively oriented in approximately equal angles. Thus, the object is readily identified as a polygon by the contour extraction technique. Confirmation of this shape may be obtained via the following equation:

$$S^2/A = N \tan \theta/2 \quad \text{(VII)}$$

The mathematical analysis provided with the respective objects illustrated in FIGS. 12a–12c can be incorporated into the read-only-memory portion of the microprocessor 13 for further enhancing the ability of the microprocessor 13 to employ the signal data obtained from the imager 11 for object recognition and comparison purposes.

Some typical examples of objects whose shape or configuration may be characterized by the microprocessor 13 upon being viewed by the imager 11 are illustrated in FIGS. 13a–13f, with the contour "data signature" unique to these respective objects as determined by the contour extraction technique herein described being given. This unique contour "data signature" will basically remain invariant over a relatively large range of general distortions of the particular object in question. Moreover, the contour "data signature" for each object is not sensitive to the orientation of the object, except that it may appear the contour "data signature" has undergone the operation of a circular shift register. In the latter respect, referring to the object "A" in FIG. 13e, for example, its contour "data signature" as shown is (neglecting the vector lengths)

$$3 \quad 4 \quad -2 \quad -2 \quad 4$$

Figure 13A:
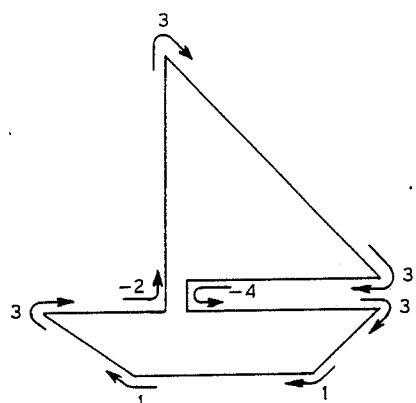
FIGS. 13a-13f are diagrams respectively illustrating different objects for character recognition by the didactic device of FIG. 1, and showing the "contour signatures" unique thereto.
Figure 13B:
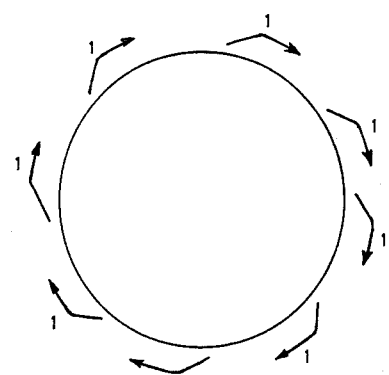
Figure 13C:
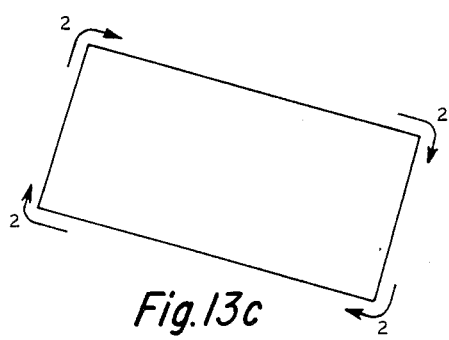
Figure 13D:
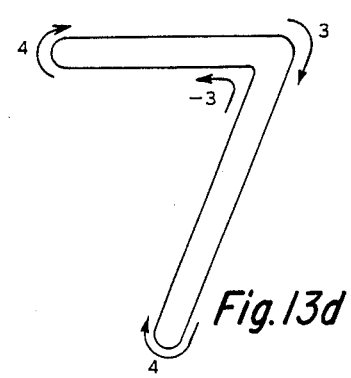
Figure 13E:
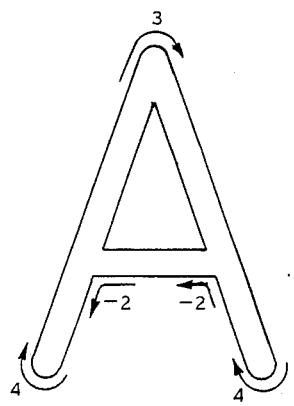
Figure 13F:
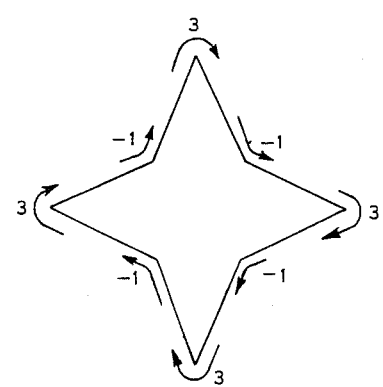

Object identification of the "A" in FIG. 13e is based on the fact that there are five "words" in the unique contour "data signature" with particular values and in a particular circular sequence to identify the shape, and therefore the object in question. Other contour "data signatures" for the objects as shown are as follows:

| FIG. | | | | | | | | | |
|---|---|---|---|---|---|---|---|---|---|
| 13a | sailboat | 3 | 3 | −4 | 3 | 1 | 1 | 3 | −2 |
| 13b | circle | 1 | 1 | 1 | 1 | 1 | 1 | 1 | 1 |
| 13c | rectangle | 2 | 2 | 2 | 2 | | | | |
| 13d | "7" | 4 | 3 | 4 | −3 | | | | |
| 13f | star | 3 | −1 | 3 | −1 | 3 | −1 | 3 | −1 |

These contour "data signatures" and others may be stored as firmware in the RAM of the microprocessor 13. When the imager 11 of the didactic device 10 is exposed to a flash card or similar implement on which indicia of some form appears, the image signal data a collected in the RAM 12 is compared with the data signatures comprising the firmware in the RAM of the microprocessor 13. The character recognition comparator of the microprocessor 13 produces an analytical signal output determinative of the comparative analysis between the image signal data and the closest data signature within the firmware of the RAM of the microprocessor 13. This analytical signal output from the character recognition comparator triggers the speech synthesis electronics 14 to generate an audio signal output based upon the coded digital inputs provided by the vocabulary memory 15 and reflective of the content of the analytical signal output from the character recognition comparator, and the audio output is converted to vocal sound by the speaker circuitry 18. Depending upon the application desired, the speech synthesis electronics 14 can be tailored to deliver spoken comments of any suitable character as determined by the vocabulary stored in the ROM 15. The spoken comments will be relevant to the object viewed by the imager 11 of the didactic device 10 in the preferred implementation of this invention. Thus, when the didactic device is in the form of a doll 20 as in FIG. 2, the doll will have the apparent ability to "see" and to "speak" about what it has "seen".

It will be understood that various modifications in the specific embodiments of the present invention which have been described and illustrated may be made by those skilled in the art without departing from the scope and principle of the invention as expressed in the appended claims.

What is claimed is:

1. The method of character recognition comprising:
   (a) receiving an image of a test character in an imager;
   (b) transmitting data representative of said test character to a first memory;
   (c) determining a series of contour numbers representing the direction of curvature of the periphery of the contour of the test character by reading data representative of the periphery of the test character in a sequence that circumnavigates the test character data, wherein the series of contour numbers are grouped in pairs, the first number of each pair representing the distances between changes in curvature and the second number representing the change in the amount of curvature as between adjacent curvatures;
   (d) providing a contour number to said series of contour numbers only if the direction of curvature of a portion of the character exceeds the previous direction of curvature for a predetermined distance as the character is circumnavigated;
   (e) comparing the contour numbers of the test character to corresponding contour numbers of a reference character; and
   (f) outputting the reference character which corresponds to said test character.

2. The method according to claim 1 wherein a horizontal straight line is considered one direction of curvature and a line at an angle with respect to said straight line is considered a second direction of curvature.

3. The method comprising:
   (a) storing data representative of a test character in a memory,
   (b) circumnavigating said test character data in said memory, said circumnavigating procedure including a starting reference cell and individual steps to reference cells until the starting reference cell is arrived at a second time, determining and recording certain parameters of the test character during said circumnavigation, said parameters including the width, height, perimeter and area with the periphery of the test character,
   (c) said perimeter being determined by the following steps:
   (i) providing a transition vector for each step from one reference cell to the next reference cell,
   (ii) incrementing a first counter N1 each time the movement from one reference cell to the next is straight,
   (iii) incrementing a second counter N2 each time the movement from one reference cell to the next is a turn,
   (iv) providing an output as an approximation of the perimeter around the periphery of said test character using the formula $$P = N1 + N2/\sqrt{2}$$

wherein P represents the approximation of the perimeter,
   (d) comparing the perimeter and said other parameters of the test character with corresponding parameters of reference characters which are stored in a memory; and,
   (e) providing an output indicating the results of such comparision.

4. The method comprising:
   (a) storing data representative of a test character in a memory,
   (b) circumnavigating said test character data in said memory, said circumnavigation procedure including a starting reference cell and individual steps to reference cells until the starting reference cell is arrived at a second time, determining and recording certain parameters of the test character during said circumnavigation, said parameters including the width, height, perimeter and area within the periphery of the test character
   (c) said area within the periphery being determined by the following steps:
   (i) providing a transition vector for each step from one reference cell to the next reference cell,
   (ii) incrementing an L register by one each time the direction of motion to the next reference cell is to the right and decrementing said L register by one each time the direction of motion to the next reference cell is to the left,
   (iii) incrementing an A register by the value in the L register each time a direction of motion is downward and decrementing said A register by the value in the L register each time the direction of motion is upward,
   (iv) providing the output of the A register as the area within the periphery of the test character when the circumnavigation is completed,
   (d) comparing the perimeter and said other parameters of the test character with corresponding parameters of reference characters which are stored in a memory; and,
   (e) providing an output indicating the results of such comparision.

* * * * *